Sept. 28, 1943.   R. SCHÖNFELD ET AL   2,330,630
PRODUCTION OF CANDY
Filed Jan. 8, 1941
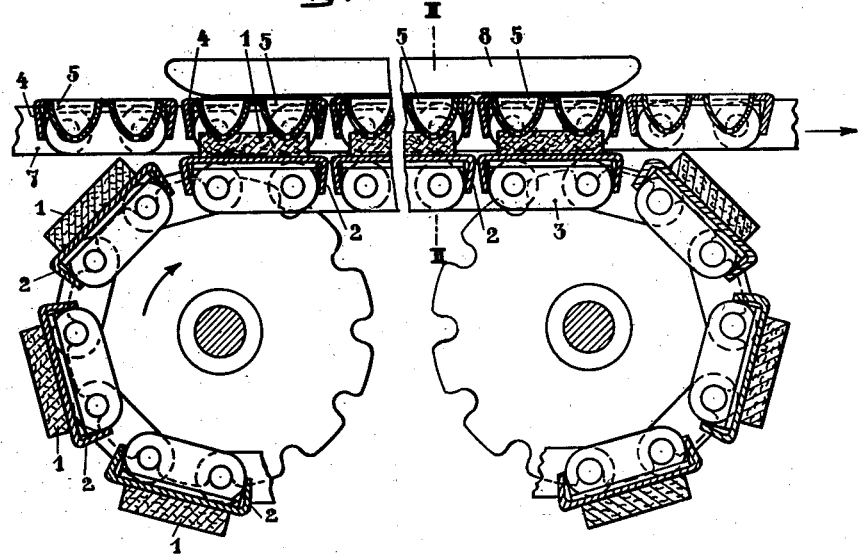
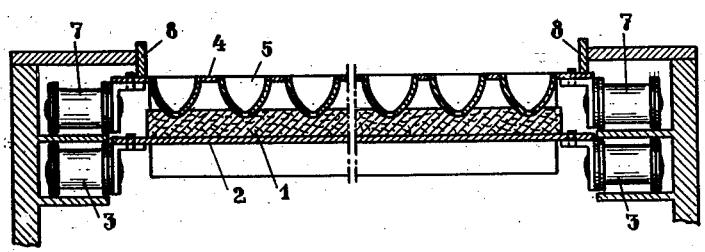
INVENTORS
Richard Schönfeld
Hermann Fiedler
BY
ATTORNEYS Patented Sept. 28, 1943

2,330,630

UNITED STATES PATENT OFFICE 2,330,630

PRODUCTION OF CANDIES

Richard Schönfeld and Hermann Fiedler, Dresden, Germany; vested in the Alien Property Custodian Application January 8, 1941, Serial No. 373,588
In Germany January 29, 1940

3 Claims. (Cl. 107—1)

This invention relates to apparatus for filling molds with a mass intended to form the center or core of chocolate covered candies, and constitutes an improvement of the method and apparatus covered by application Ser. No. 299,746, filed October 16, 1939 by L. Dotzer and issued December 23, 1941, as Patent No. 2,267,494.

According to this application, metal molds having a central bottom opening are filled with fluid cacao butter which after withdrawal leaves a thin film of cacao butter on the walls of the molds, whereupon the filler mass in liquid or semi-fluid condition is inserted, solidified by cooling, and finally the frame holding the molds with their finished centers is inverted to eject the fillings from the molds.

This method and the devices proposed for carrying it out operate satisfactorily, provided the filling mass poured hot into the molds quickly solidifies to such a degree that very little of the filling or none at all, escapes through the small bottom opening of each mold. If the filling mass however has a greater softness, a sort of creamy consistency of the centers after cooling, the sugar used for the filling is boiled at a somewhat lower temperature, whilst the filling mass itself is poured into the molds at the usual temperature. Furthermore, the ranges of uses of a filling mass prepared as indicated above is considerably widened, since the thin liquid mass rapidly spreads in the mold and thus forms a uniform surface which insures the production of articles having a smooth surface as is necessary for instance when making chocolate cream tablets, rings for Christmas tree decorations, etc. Such a filling mass possesses after cooling the desired creamy consistency and retains it permanently. As the time required for passing from the hot liquid state into a soft and creamy condition is of course much longer than that needed by the first-mentioned mass which is much harder when cooled, the method and apparatus of the earlier application above identified are unsatisfactory and could be employed only together with auxiliary means, since the hot mass of the second type which remains fluid for a longer period will partly drop through the bottom openings of the molds after completion of the pouring operation. Due to the escape of a portion of the mass of each mold through the bottom opening thereof a depression is produced in the center of the surface of the initially fluid and gradually solidifying filler mass with the result that the bottom of the finished core or center discloses a central concave portion in its surface, which of course is highly undesirable.

According to the invention, this disadvantage is eliminated by altering the known method in respect to the filling of the molds with the filling mass and at least until this mass has solidified to a degree preventing the passage of portions of the mass through the bottom openings, the latter are closed by means of sealing members made of felt, rubber, etc. and arranged on endless conveyors, etc. which are moved in the same direction and at the same speed as the molds. To equalize the pressure produced by the sealing members two counterpressure bars are provided for holding down the frames for the molds.

The invention is illustrated by way of example in the accompanying drawing, in which Figure 1 is a vertical central section of part of the device and Fig. 2, a vertical cross section thereof on the line II—II of Fig. 1.

Below the frames 4 holding the molds 5 and moved at uniform speed on endless chains 7 in the direction of the arrow, a conveyor with sealing pads or members 1 is continuously moved in the direction of the curved arrow in Fig. 1 at the same speed as the molds 5 and within range of, and beyond, a pouring device, not shown. This conveyor passes over four sprocket wheels of which one only is shown in Fig. 1 and constitutes endless chains 3 to which supports 2 are secured which mount the sealing pads or members 1 made of felt, rubber, etc. In order to counteract the pressure exerted by the sealing members 1 upon the molds 5 and the mold frames 4 two counterpressure bars 8 are provided above the frames 4 and secured to the machine frame.

What is claimed is:

1. Apparatus for mold filling in candy manufacture or the like, comprising a conveyor having a multiplicity of molds thereon, each perforated at its bottom, a contiguous endless perforation sealing conveyor comprising a pair of sprocket wheels, chains movable thereabout, comprising a multiplicity of links, each of said links having a resilient pad thereon, said conveyors being driven at equal linear speed, thereby bringing the pads successively into sealing engagement with the perforations of the successive molds as they pass over one sprocket wheel, and maintaining them in such engagement during their traverse in one direction to the other sprocket wheel, and successively withdrawing the pad from the molds as they pass over the latter sprocket wheel.

2. The combination recited in claim 1 in which presser bars urge the mold conveyor into secure sealing contact with respect to the sealing pad conveyor.

3. A movable molding device for candies and the like, comprising an endless conveyor having a series of molds thereon, each mold being open at its bottom, a second endless sealing conveyer having a portion contiguous to the first conveyer, said second conveyer comprising two parallel link chains, a resilient pad on each link engaging the open bottom of one of said molds, sprocket wheels for driving said sealing conveyer, the engagement of the pads with the molds constraining the conveyers to travel in unison.

RICHARD SCHÖNFELD.
HERMANN FIEDLER.